No. 788,444. PATENTED APR. 25, 1905.
O. J. WEIL.
APPARATUS FOR MANUFACTURING FEATHERBONE.
APPLICATION FILED JAN. 30, 1905.
4 SHEETS—SHEET 3.
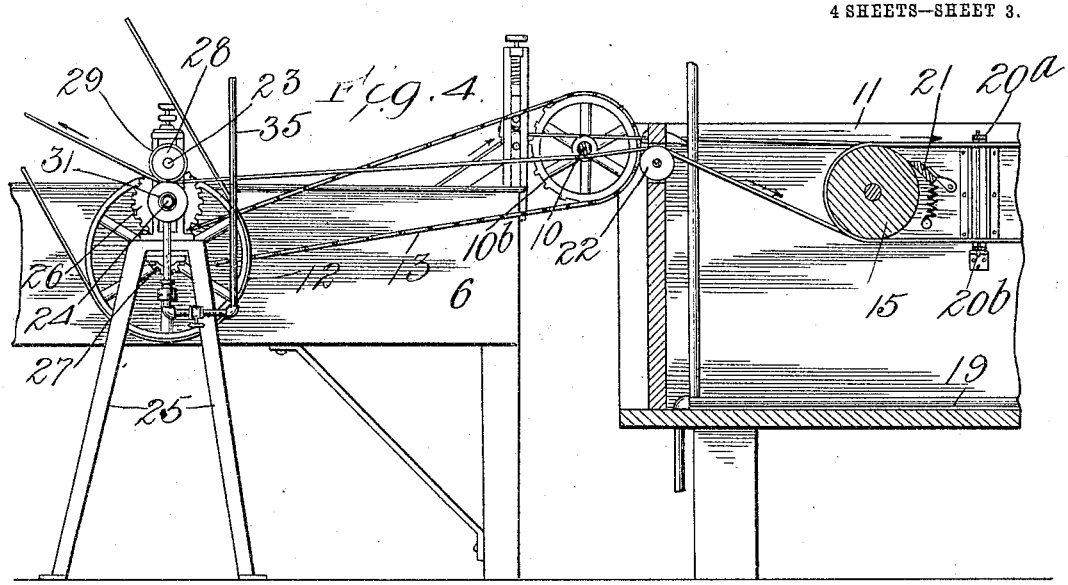
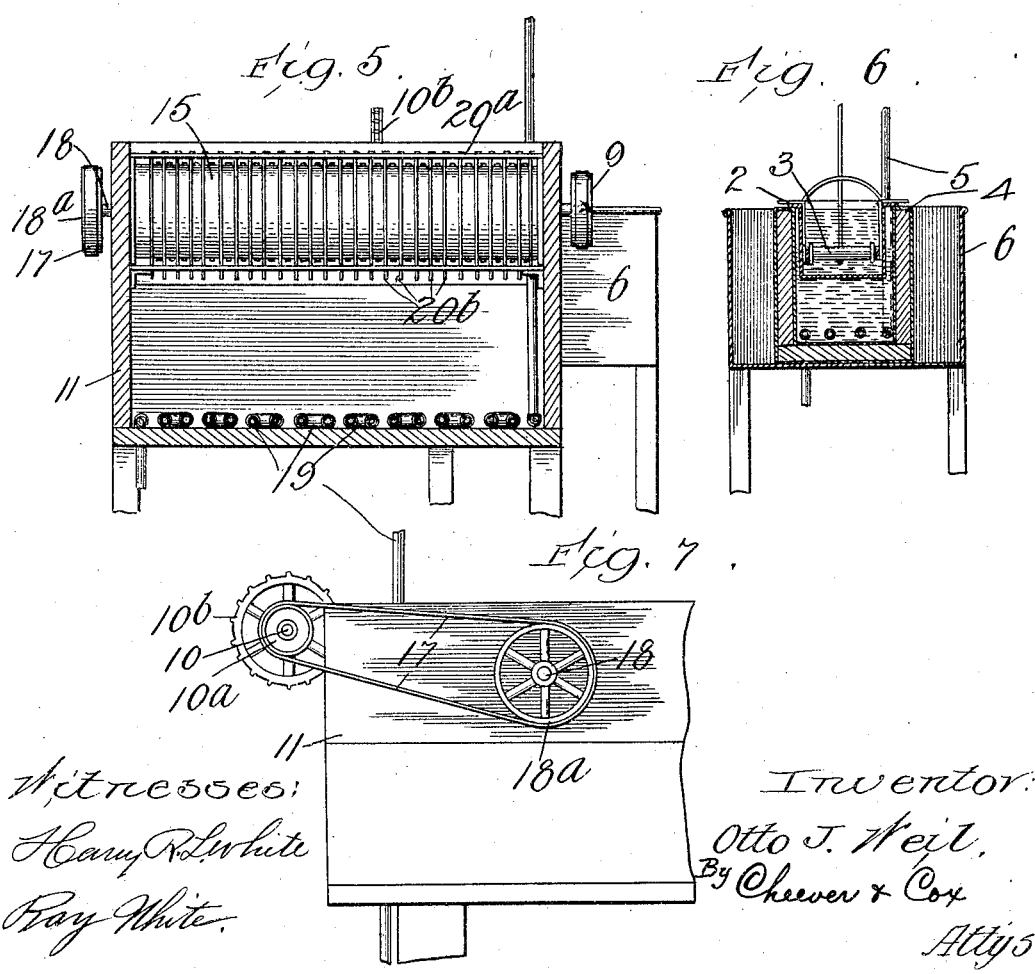
Witnesses:
Harry R. L. White
Ray White
Inventor:
Otto J. Weil,
By Cheever & Cox
Attys No. 788,444. PATENTED APR. 25, 1905.
O. J. WEIL.
APPARATUS FOR MANUFACTURING FEATHERBONE.
APPLICATION FILED JAN. 30, 1905.
4 SHEETS—SHEET 4.
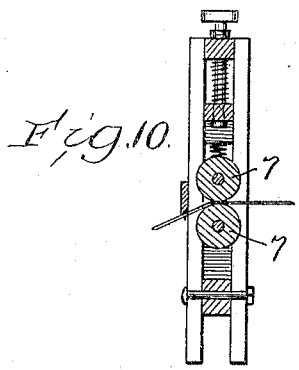
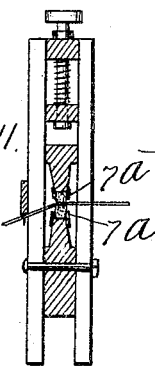
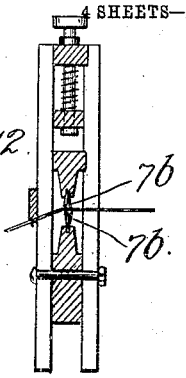
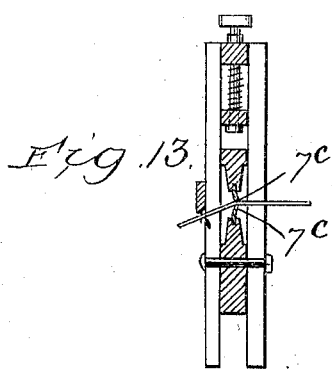
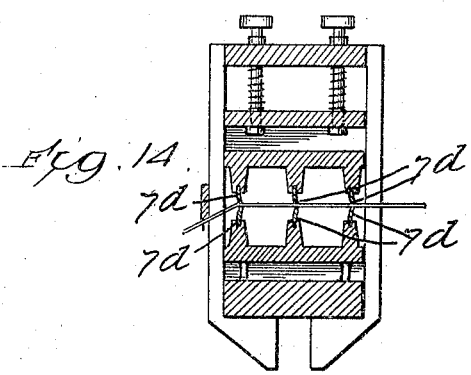
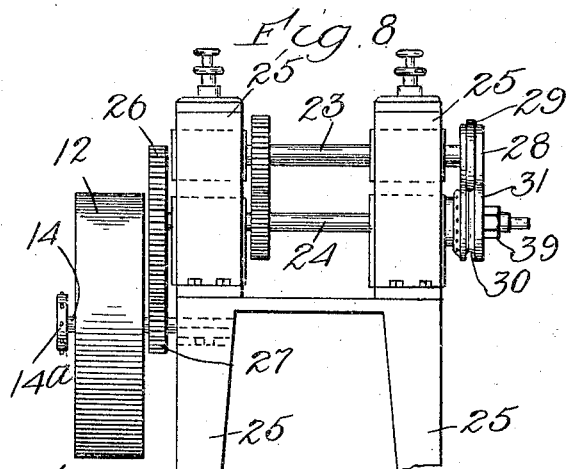
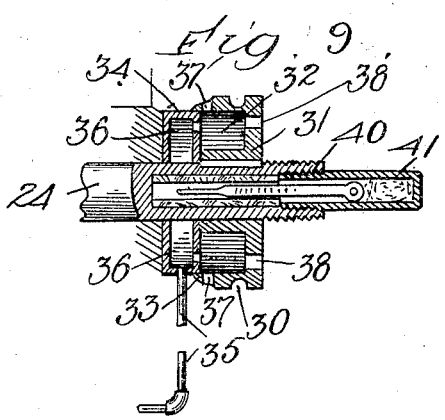
Inventor
Otto J. Weil
By Cheever & Cox
Atty's No. 788,444. Patented April 25, 1905.

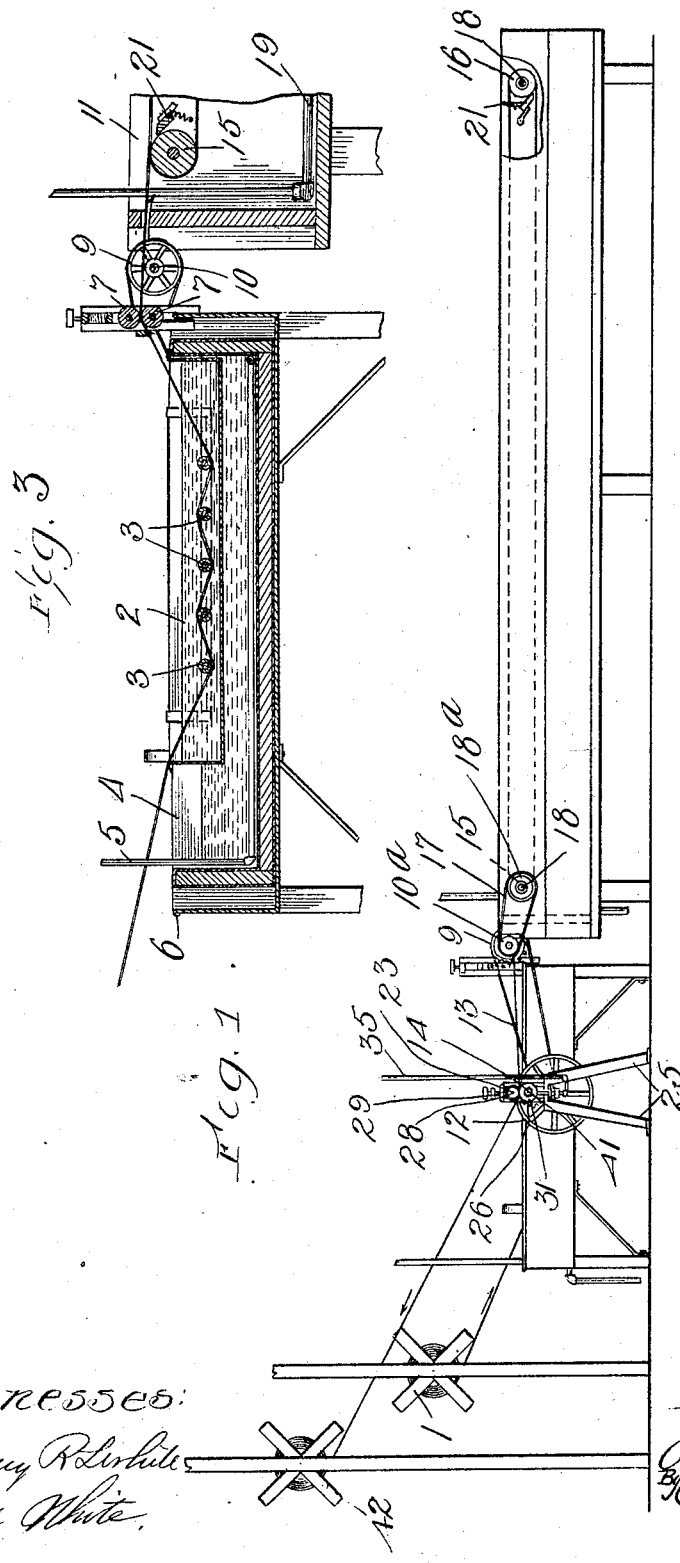

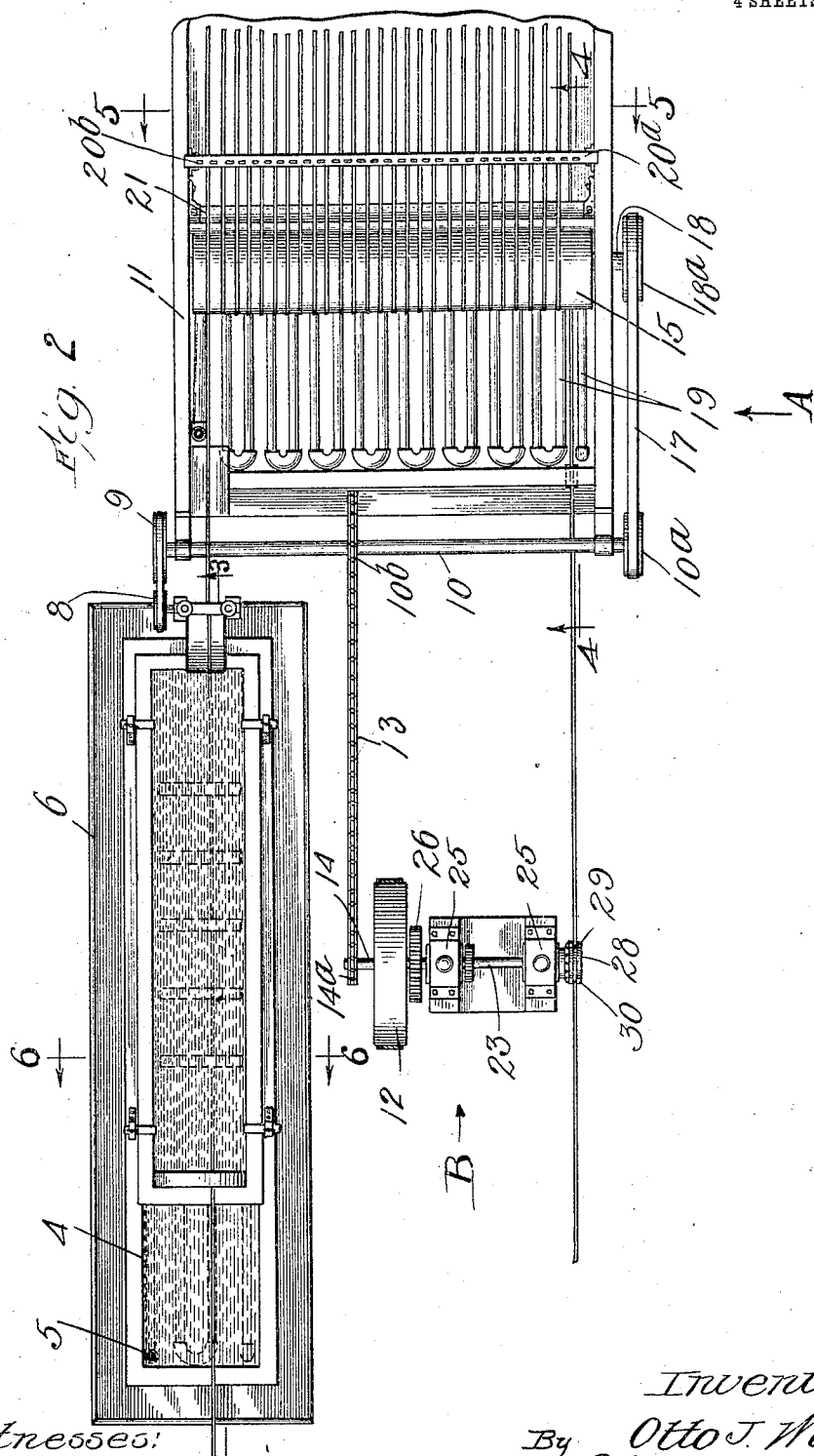

UNITED STATES PATENT OFFICE.

OTTO J. WEIL, OF CHICAGO, ILLINOIS, ASSIGNOR TO AMERICAN FEATHERBONE COMPANY, OF CHICAGO, ILLINOIS, A CORPORATION OF ILLINOIS.

APPARATUS FOR MANUFACTURING FEATHERBONE.

SPECIFICATION forming part of Letters Patent No. 788,444, dated April 25, 1905.

Application filed January 30, 1905. Serial No. 243,346.

*To all whom it may concern:*

Be it known that I, OTTO J. WEIL, a citizen of the United States, residing at Chicago, in the county of Cook and State of Illinois, have invented a certain new and useful Improvement in Apparatus for Manufacturing Featherbone, of which the following is a specification.

This invention relates to apparatus for manufacturing featherbone for use as a stiffener for corsets and other garments; and the object of the invention is to provide simple and reliable apparatus for sizing, drying, and rolling strips after they have been bundled and wound according to any of the methods well known to those skilled in the art.

This present invention constitutes an improvement of the apparatus shown and described in my patent application for a process of manufacturing featherbone corset and garment stiffener, filed October 6, 1902, Serial No. 126,124, to be issued January 31, 1905.

I attain my objects by the apparatus illustrated in the accompanying drawings, in which—

Figure 1 is a general side view of the complete apparatus. Fig. 2 is a plan view thereof drawn to an increased scale, the featherbone-reels and a portion of the drying-box being omitted. Fig. 3 is a vertical sectional view through the glue-box, taken on the line 3 3, Fig. 2. Fig. 4 is an elevation of the rolls, portion of the glue-box, and portion of the drying-box, the latter being taken in section on the line 4 4, Fig. 2. Fig. 5 is a transverse sectional elevation taken on line 5 5, Fig. 2, looking in the direction of the arrows. Fig. 6 is a transverse sectional elevation looking in the direction of the arrows on the line 6 6, Fig. 2. Fig. 7 is a fragmentary side elevation looking in the direction of the arrow at A, Fig. 2. Fig. 8 is an elevation of the rolling-machine looking in the direction of the arrow at B, Fig. 2. Fig. 9 is a fragmentary sectional view of the heated roll, taken through the central axis thereof and showing the method of supplying gas thereto and the construction whereby the temperature of the roll may be ascertained. Fig. 10 is a vertical sectional view through the rubber rollers employed at the end of the glue-box to remove the excess glue from the strip as it emerges from the glue-box. Fig. 11 shows felt scrapers which may be substituted for the rubber rollers illustrated in Fig. 10. Fig. 12 illustrates the use of steel brushes in lieu of the devices shown in Figs. 10 and 11. Fig. 13 illustrates the manner in which rubber plates or squeegees may be used for the same purpose. Fig. 14 shows a gang of squeegees arranged one after the other for use wherever it is desirable to have the strips emerge from the glue-bath in an unusually dry condition.

Similar numerals refer to similar parts throughout the several views.

It will be understood by those skilled in the art of making featherbone that the procedure is to first obtain fibers of the quill of feathers and then form them into cords by wrapping thread around them. If a product of considerable width is desired, a number of cords are secured together side by side by means of other threads, and the strip thus formed is subsequently immersed in glue, then dried, and finally calendered. Such a product, for example, is shown and described in the patents issued to E. K. Warren for a corset-stiffener, October 16, 1883, No. 286,749, and for a stiffening-strip and mode of producing the same, issued February 3, 1885, No. 311,621. This invention is concerned only with the apparatus for treating the article after it has been formed into continuous strips or blades.

Referring to the drawings, 1 represents the reel containing an unsized strip. From this reel the unsized strip passes directly to the box 2, containing the sizing liquid, which liquid consists chiefly of glue and water. Within the box are arranged guides 3 3, which are preferably antifriction-rollers and are designed to guide the strip through the glue-bath in such manner that the glue will have access to all portions of the strip. The glue in box 2 is kept hot by means of a bath of water contained in an inclosing box 4, provided with steam-pipes 5 for keeping the water-bath hot. In order to prevent overflow of water from boxes 2 and 4, it is desirable to mount said boxes within the overflow-tank 6, as best shown in Figs. 2 and 3.

At the extremity of the glue-bath, where the strip emerges, means are provided for removing the excess glue. This may be accomplished by various methods, a suitable device being shown in detail in Fig. 10 and also clearly illustrated in Fig. 3. This device consists of a pair of soft-rubber rollers 7 7, the axis of the lower one being stationary and the upper one being vertically adjustable after the manner of the ordinary domestic wash-wringer. By making one of the rollers vertically adjustable the amount of wet glue adhering to the strip may be regulated; but as the strip at this point is wet and "limp" no other effect is obtained by the rollers except to remove the surplus glue. For the purpose of preventing undue tensional strain upon the strip by reason of the action of the drums in the drying-box hereinafter described the lower one of the rollers 7 is driven by means of a pulley 8, belted to the pulley 9 on the main shaft 10.

Shaft 10 is journaled in bearings mounted upon the drying-box 11, hereinafter referred to, and receives its power from the main driving-pulley 12 on the rolling-machine, hereinafter referred to. Motion is transmitted from pulley 12 to shaft 10 by means of chain 13 training over sprocket 14$^a$ on shaft 14 of the rolling-machine and sprocket 10$^b$ on shaft 10 above mentioned. From the glue-bath the strip passes into said drying-box 11, which is of considerable length and has mounted therein near the ends thereof the drums 15 and 16. Drum 15, which is located in the end nearest the shaft 10, is rigidly secured to driving-shaft 18, which is driven from shaft 10 by means of belt 17, which passes over pulleys 10$^a$ and 18$^a$, located on shafts 10 and 18, respectively.

The drums 15 and 16 are so designed that the featherbone strip may pass back and forth from one to the other in a continuous piece or pieces tied together in such manner that any given portion of the strip will travel from end to end of the drying-box many times and become thoroughly dry before leaving the box, notwithstanding the fact that the strip enters the box in a wet and frequently "all but dripping" condition. Under ordinary circumstances it is not necessary to provide power-driven means for rotating drum 16, as this drum will be driven by the mere friction of the strip thereon. The necessary heat for drying the strip is supplied by steam-coils 19, located, preferably, near the bottom of said box 11.

The featherbone strip is best guided in its travel over the drums 15 and 16 by means of the gratings 20, which are secured in the drying-box at points adjacent to said rollers and consist of a set of vertically-arranged rods or pins 20$^a$, mounted in substantial cross-bars 20$^b$ 20$^b$, as best shown in Figs. 2 and 5. Said bars are apertured to loosely receive said pins, and the pins have heads thereon by which the rods may be suspended, so as to be removable for cleaning purposes. Another and also important function, however, of this construction is that by thus making the pins readily removable and readjustable time and effort may be saved in threading the featherbone through the drying-box, for with the pins removed the strip may be passed back and forth around the drums without much regard to spacing and the strip be subsequently spaced and the pins dropped into position one by one between the different lengths.

Although the featherbone strip as it enters drying-box 11 has had most of the surplus sizing removed by rollers 7 or their equivalents, the strip passes into the box in a wet condition, and there is a tendency for more or less sizing to be collected upon drums 15 and 16, especially at the parts thereof where the strip is wettest. I have overcome this difficulty by means of the scrapers 21 21, which are pivotally or otherwise movably mounted in box 11 adjacent to drums 15 and 16 and are spring-influenced to bear against the surface of said drums and scrape the sizing therefrom as fast as it is deposited.

As the strip emerges in a dry condition from box 11, by preference passing over the guide-roller 22, it passes through the rolling-machine above mentioned, which is similar in its construction to the machine described and shown in my prior patent application. Said rolling-machine, which is also a heating-machine, comprises the shafts 23 and 24, which are geared together so as to rotate in opposite directions at the same peripheral speed and are journaled in the framework 25. The lower one, 24, of said shafts has a spur-gear 26 rigidly secured thereto, which is driven by the pinion 27, rigidly secured to the jack-shaft 14, previously referred to. The pulley 12 is driven by an external source of power, and power is transmitted to the heating and rolling machine through the spur-pinion 27 and to the said shaft 10 by the sprocket 14$^a$.

Upon shaft 23 is rigidly secured a roller 28, having on its periphery an annular flange 29, adapted to fit into the groove 30 in the lower roller 31. Said lower roller is rigidly secured to shaft 24 and is interiorly recessed to afford a chamber 32 for the combustion of the heating-gases. At its inner edge said roller 31 has a flange 33, which fits over the gas-distributing box 34, so as to make sliding contact therewith, as best shown in Fig. 9. Said distributing-box is a hollow annular receptacle surrounding the shaft 24 and is non-rotatable. The outer periphery of said distributing-box fits within the flange 33 of the roller 31 in such manner that the gases of combustion from the chamber 32 are prevented from escaping. A pipe 35 supplies gas to said distributing-box, and said gas escapes through the small apertures 36 in the face of said box into the combustion-chamber 32 above mentioned. Said apertures 36 are preferably arranged in a circle about the center of the shaft 22, so as to effect an even distribution of the gas as it escapes from said distributing-box 34 into said combustion-chamber 32.

In order to supply sufficient air to the combustion-chamber 32, a series of apertures 37 are provided in the outer face of the roller 31, and a second series of apertures 38 are provided near the flange 33 thereof. Roller 31 is held in proximity to box 34 by means of the retaining-nut 39, which screws onto the threaded portion 40 of shaft 24.

It is desirable in order to accurately determine the temperature of roller 31 to bore out the extremity of shaft 24 adjacent to said roller for receiving a thermometer, and the chamber thus formed should be closed by means of a screw-cap 41. By regulating the supply of gas to the chamber of roller 31 said roller may be brought to almost any temperature desired, and in accordance with the process described in my former patent application the temperature of said roller is kept higher than 175° Fahrenheit.

The rollers 28 and 31 rotate in such direction that the featherbone strip will pass from the drying-box, through the heating and rolling machine, and up to the reel 42, which receives the finished product. With my apparatus the motion of the featherbone strip is continuous from reel 1, through the glue-box 2, drying-box 11, and rolling-machine up to reel 42. It will be also noted the strip is positively engaged and power-driven at two different parts of the apparatus—to wit, the rolling-machine and the drum 15. It may also be urged onward at the glue-box by rotating the lower rubber roller 7. If the rollers 28 and 31 should rotate too fast for drum 15, the featherbone strip would be broken, while, on the other hand, if they rotated too slowly the strip would gather and become collected at a point between the drying-box and the rolling-machine, which would prevent the proper operation of the apparatus. With my apparatus this danger is eliminated by the fact that the shaft 14, which drives the rollers 28 and 31, is positively connected to the shaft 18, which drives the drum 15. As a result if the speed of the rolling-machine is increased it will produce an exactly corresponding increase in the speed of drum 15, and consequently the two driving elements of the apparatus will be synchronous in their operation. The same is true of the rubber roller 7 in case such roller is employed. It is not necessary, however, to employ rollers at the exit end of the glue-box, for any means which will remove the surplus glue from the strip may be substituted. For example, in Fig. 11 the felt strips or scrapers $7^a$ $7^a$ are so arranged that the featherbone strip passes between them and has the surplus glue removed by contact therewith. This removal of the surplus glue may also be accomplished by means of the steel brushes $7^b$ $7^b$. (Shown in Fig. 12.) In Fig. 13 the rubber blades or squeegees $7^c$ $7^c$ are employed in a similar manner, and in case a single set of squeegees does not remove a sufficient amount of glue a gang or plurality of sets of squeegees $7^d$ may be employed, one behind the other, as shown in Fig. 14.

One great advantage this apparatus has over any heretofore existing lies in the fact that it completely eliminates the handling of the strip from the time it first enters the glue-box to the time when it emerges as a completely-finished product, subjected in due course to the three steps of the process—to wit, sizing, drying, and simultaneous heating and rolling.

It will be noted that in case scrapers or brushes are used to remove the surplus glue from the strip the power-driven drum 15 will serve to draw the strip through the bath and glue-removers.

I claim as my invention—

1. Apparatus for manufacturing featherbone strips comprising a drying-box having a plurality of drums therein around which the sized strip passes; and a rolling-machine for receiving said strip as it emerges from said drying-box, said rolling-machine and one of the drums of said drying-box being power-driven; and having positive connections between them for rotating them at the same rate of speed.

2. Apparatus for manufacturing featherbone strips comprising a heated drying-box, a plurality of drums journaled therein around which the sized strip is adapted to pass; a rolling-machine comprising a pair of rollers rotating in opposite directions and adapted to receive the dried strip between their adjacent surfaces, and said rolling-machine having means for heating its rollers; and a power device connected both to said rollers and to one of said drums for driving them all at the same peripheral speed.

3. Apparatus for manufacturing featherbone strips comprising a glue-box; means for guiding the strip through said glue-box; a drying-box through which the strip is adapted to pass; a compound heating and rolling machine adapted to receive the strip directly as it emerges from the drying-box; and means for advancing said strip with a continuous and uniform motion through the entire apparatus.

4. Apparatus for manufacturing featherbone strips comprising a glue-box; means for guiding the strip through said glue-box; means at the exit of said glue-box for removing the surplus wet glue from said strip; a drying-box through which the strip is adapted to pass; a compound heating and rolling machine adapted to receive the strip directly as it emerges from the drying-box; and means for advancing said strip with a continuous and uniform motion through the entire apparatus.

5. Apparatus for manufacturing featherbone strips comprising a heated drying-box, a plurality of drums journaled therein around which the sized strip is adapted to pass, scrapers for removing glue from the surface of said drums; a rolling-machine comprising a pair of rollers rotating in opposite directions and adapted to receive the dried strip between their adjacent surfaces, and said rolling-machine having means for heating its rollers; and a power device connected both to said rollers and to one of said drums for driving them all at the same peripheral speed.

6. Apparatus for manufacturing featherbone strips comprising a heated drying-box, a plurality of drums journaled therein around which the sized strip is adapted to pass; gratings adjacent to said drums for guiding the strip thereonto, a rolling-machine comprising a pair of rollers rotating in opposite directions and adapted to receive the dried strip between their adjacent surfaces, and said rolling-machine having means for heating said rollers; and a power device connected both to said rollers and to one of said drums for driving them all at the same peripheral speed.

In witness whereof I have hereunto subscribed my name in the presence of two witnesses.

OTTO J. WEIL.

Witnesses:
JACOB ROTHSCHILD,
MARTIN CONNORS.